United States Patent
Shoji et al.

(10) Patent No.: US 8,475,930 B2
(45) Date of Patent: Jul. 2, 2013

(54) COMPOSITE COATED METAL SHEET, TREATMENT AGENT AND METHOD OF MANUFACTURING COMPOSITE COATED METAL SHEET

(75) Inventors: Hiromasa Shoji, Chiba (JP); Hiroshi Kajiro, Chiba (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 845 days.

(21) Appl. No.: 12/085,446

(22) PCT Filed: Dec. 5, 2006

(86) PCT No.: PCT/JP2006/324625
§ 371 (c)(1),
(2), (4) Date: May 23, 2008

(87) PCT Pub. No.: WO2007/066796
PCT Pub. Date: Jun. 14, 2007

(65) Prior Publication Data
US 2009/0142589 A1    Jun. 4, 2009

(30) Foreign Application Priority Data
Dec. 6, 2005  (JP) .................... 2005-352512

(51) Int. Cl.
| B32B 9/00  | (2006.01) |
| B05D 7/00  | (2006.01) |
| B05D 1/18  | (2006.01) |
| C25D 9/00  | (2006.01) |
| C25D 11/00 | (2006.01) |

(52) U.S. Cl.
USPC ........... 428/469; 428/336; 428/472; 427/409; 205/333; 205/316

(58) Field of Classification Search
None
See application file for complete search history.

(56) References Cited

U.S. PATENT DOCUMENTS

| 5,584,946  | A  |    | 12/1996 | Karmaschek et al. |
| 5,735,939  | A  |    | 4/1998  | Glausch et al. |
| 6,419,731  | B2 |    | 7/2002  | Inbe et al. |
| 7,510,612  | B2 |    | 3/2009  | Matsukawa et al. |
| 7,531,051  | B2 |    | 5/2009  | Nakayama et al. |
| 7,608,337  | B2 | *  | 10/2009 | Tanaka et al. ............. 428/472 |
| 7,641,981  | B2 |    | 1/2010  | Sato et al. |
| 7,682,706  | B2 |    | 3/2010  | Shoji et al. |
| 7,883,616  | B2 | *  | 2/2011  | Shoji et al. ............... 205/316 |
| 2001/0050029 | A1 |  | 12/2001 | Inbe et al. |
| 2003/0209293 | A1 |  | 11/2003 | Sako et al. |
| 2004/0118482 | A1 | * | 6/2004 | Steinmetz et al. ......... 148/252 |
| 2004/0163735 | A1 |  | 8/2004  | Matsukawa et al. |
| 2004/0163736 | A1 |  | 8/2004  | Matsukawa et al. |
| 2004/0170840 | A1 |  | 9/2004  | Matsukawa et al. |
| 2004/0187967 | A1 |  | 9/2004  | Matsukawa et al. |
| 2004/0244874 | A1 |  | 12/2004 | Nakayama et al. |
| 2005/0067056 | A1 |  | 3/2005  | Shoji et al. |
| 2006/0185769 | A1 |  | 8/2006  | Nakayama et al. |
| 2007/0141382 | A1 |  | 6/2007  | Shoji et al. |
| 2008/0286470 | A1 |  | 11/2008 | Matsukawa et al. |
| 2009/0004491 | A1 |  | 1/2009  | Sato et al. |
| 2010/0038250 | A1 |  | 2/2010  | Matsukawa et al. |

FOREIGN PATENT DOCUMENTS

| DE | 43 17 217 A1     | 12/1994 |
| EP | 1 241 236 A2     | 9/2002  |
| EP | 1 433 878 A1     | 6/2004  |
| EP | 1 455 001 A1     | 9/2004  |
| EP | 1 693 192 A1     | 8/2006  |
| GB | 2 343 681 A      | 5/2000  |
| JP | 7-278853 A       | 10/1995 |
| JP | 2000-282256 A    | 10/2000 |
| JP | 2000-282267 A    | 10/2000 |
| JP | 2001-234352 A    | 8/2001  |
| JP | 2001-303267 A    | 10/2001 |
| JP | 2002-30460 A     | 1/2002  |
| JP | 2004-190121 A    | 7/2004  |
| JP | 2004-218075 A    | 8/2004  |
| JP | 2005-161715 A    | 6/2005  |
| JP | 2005-264230 A    | 9/2005  |
| JP | 2006-255540 A    | 9/2006  |
| JP | 4510079 B2       | 7/2010  |
| WO | WO-96/35745 A1   | 11/1996 |
| WO | WO-02/20652 A1   | 3/2002  |
| WO | WO 02/103080 A1  | 12/2002 |
| WO | WO-03/048416 A   | 6/2003  |
| WO | WO2005/049888  * | 6/2005  |
| WO | WO-2005/053949 A1| 6/2005  |
| WO | WO 2006/098359 A1| 9/2006  |

OTHER PUBLICATIONS

Japanese Office Action dated Aug. 16, 2011 for Application No. 2006-326088.

Office Action for corresponding Japanese Patent Application No. 2006-326088, mailed Nov. 6, 2012.

Japanese Office Action dated May 8, 2012, for Application No. 2006-326088.

* cited by examiner

*Primary Examiner* — Sheeba Ahmed
(74) *Attorney, Agent, or Firm* — Birch, Stewart, Kolasch & Birch, LLP

(57) ABSTRACT

A composite coated metal sheet comprising a coated film having a low environmental impact prepared free from hexavalent chromium, and having good corrosion resistance equivalent to that provided by chromate treatment and excellent adhesiveness between the coated film and a resin layer formed on the coated film. Also, a treatment agent and a method of manufacturing the composite coated metal sheet with the treatment agent is described. The composite coated metal sheet comprises a coated film formed on a surface of a plated metal sheet or metal sheet, the coated film contains an oxide and/or a hydroxide of metal other than chromium, and an organic component comprising modified and/or unmodified functional group(s).

21 Claims, 3 Drawing Sheets

COMPOSITE COATED METAL SHEET, TREATMENT AGENT AND METHOD OF MANUFACTURING COMPOSITE COATED METAL SHEET

This Application claims priority to Japanese Application No. 2005-352512 filed in Japan on Dec. 6, 2005 and which is herein incorporated by reference in its entirety.

FIELD OF TECHNOLOGY

The invention relates to a composite coated metal sheet including a coated film which is chromium-free and has a high corrosion resistance and an excellent adhesiveness to a resin layer formed on the coated film, a treatment agent for making a composite coated metal sheet and a method of manufacturing a composite coated metal sheet.

BACKGROUND OF THE INVENTION

A variety of treatments such as coating, laminating or the like are applied to metal sheets or plated metal sheets which are to be used for various purposes so that those metal sheets can have characteristics such as proper appearance, corrosion resistance and/or insulation. For this purpose, chromate treatment may be applied on the surface of the metal sheet for substrate-treating. The chromate treatment is made for improving the corrosion resistance and the adhesiveness between the metal sheet and the resin layer such as a coated layer and/or laminate formed on the metal sheet.

In view of the recent growing concern of the environment, however, it has been desired not to use a chromate treatment containing hexavalent chromium which has a large negative environmental impact. Under the circumstance, chromate-free surface treatment has been developed in order to have the same performance as the conventional chromate treatment, yet the performance of the chromate-free treatment needs great improvement.

For example JP-A2000-282256 discloses a treatment agent as a corrosion inhibitor for aluminum containing a compound made of zinc compound and zirconium compound selected from the group consisting of an oxide, oxyacid salt, organic acid salt, fluorocomplex salt, of zirconium or mixtures thereof. It further discloses that a coated film of a zirconium compound containing a zinc compound is formed by applying the above-mentioned treatment agent onto an aluminum substrate using coating, dipping, spraying or the like and then is dried, which leads to improvement in corrosion resistance. Although it is required for the alternative method to have an excellent adhesiveness with the resin formed on the substrate as well as corrosion resistance, the reference does not mention resin-adhesiveness, i.e., the adhesiveness between the coated film of the zirconium compound and the coating or resin laminate formed on the coated film.

JP-A2000-282267 discloses a treatment agent as a corrosion inhibitor for aluminum wherein the treatment agent contains a hydrophilic resin, a crosslinkable resin reactable with zirconium and at least one selected from the group consisting of an oxide, oxyacid salt, organic acid salt or fluorocomplex salt of zirconium. It further discloses that a coated film including zirconium compound and a hydrophilic organic resin is formed by applying the treatment agent onto an aluminum substrate of a heat exchanger by coating, dipping, spraying or the like and which is then dried, which imparts hydrophilicity as well as corrosion resistance. Since the hydrophilicity imparted to the coated film is utilized, the aluminum material with the coated film can be directly used for the heat exchanger without applying a coating or laminate thereon. Thus, there is no mention of resin-adhesiveness in the case where a coating and/or resin laminate are applied on the coated film.

Further, another method of chromate-free treatment is disclosed in JP-A2002-30460. This reference proposes a metal surface treatment agent containing a vanadium compound as an essential component and an organic compound with a functional group. It further discloses that a coated film of a vanadium compound (where pentavalent vanadium (V(V)) which is poor in water resistance and alkali resistance has been reduced to tetravalent (V(IV)), trivalent (V(III)) and/or bivalent vanadium (V(II))) is formed by applying the treatment agent onto the surface of a metal material using roll-coating, dipping or the like and then is dried, which leads to improvement in corrosion resistance. The reason for the addition of the organic compound is to stabilize a vanadium compound in a treatment liquid by chelating vanadium reduced from pentavalent vanadium (V(V)) to tetravalent (V(IV)), trivalent (V(III)) and/or bivalent vanadium (V(II)). The reference also discloses the addition of water-soluble polymer to the processing liquid and formation of an additional organic polymer film on top of the coated film to improve corrosion resistance, fingerprinting resistance and surface lubricating ability. However there is no mention of adhesion property to resin in the case of application of the coating and/or resin laminate on the coated film.

Figure 1A:
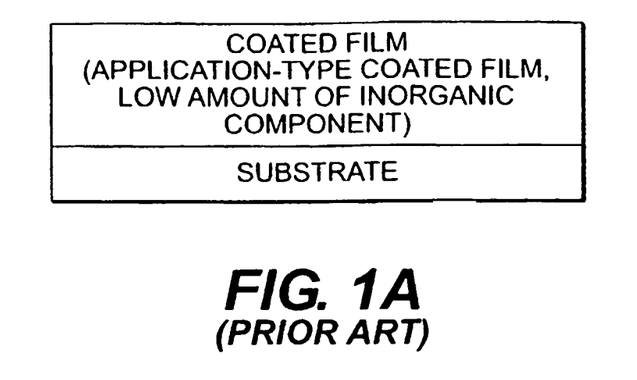
FIG. 1a is a side view of a coated metal sheet whose coated film contains a low amount of an inorganic component.
Figure 1B:
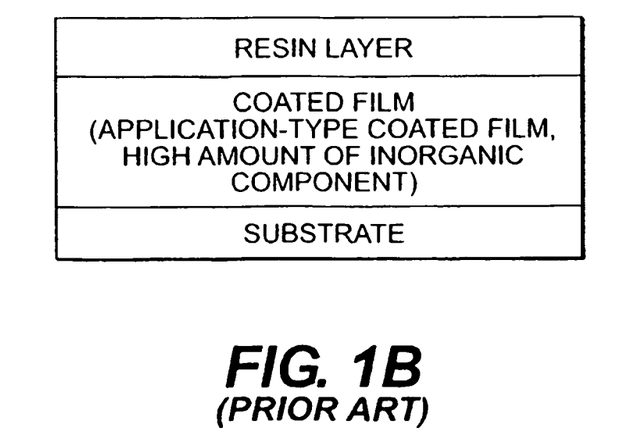
FIG. 1b is a side view of a two layered composite coated metal sheet whose lower layer (coated film) contains a high amount of an inorganic component.

As mentioned above, conventional chromate-free treatment is a method which is performed to form a coated film by applying a treatment liquid and drying it, if desired, using a heat-drying or baking treatment. That is, JP-A2000-282256 and JP-A2000-282267 teach that cross-linking is completed by baking and JP-A2002-30460 teaches both the application and drying of the treatment, which gives improved film forming ability and adhesiveness by performing heat-drying. Such an application type film forming method is a simple process similar to chromate treatment. However, in the above-mentioned chromate-free coated film prepared for its barrier function, if the coated film is not entirely formed on the substrate, i.e., a specific part of the coated film is not adhered to the substrate, corrosion will start in the specific part. Further, the conventional method needs a coating matrix or binder such as a resin as in the pigment of JP-A07-278853, which leads to the lowering of the percentage of inorganic components and may result in insufficient performance. It is possible to increase the percentage of the inorganic components by using a sol-gel method. However, this requires that the object is heated up to the temperature of several hundred degrees Celsius, which makes it impossible to contain an organic component for improving the resin-adhesiveness. (See FIG. 1)

An electrochemical precipitation method, such as the one shown in WO2003/048416, has been developed as a method for providing a coated film at room temperature. The coated film is easily formed over the entire substrate, with less defects, having a high inorganic component percentage, a high density and a high barrier function. This method includes not only merely dipping the substrate in the treatment liquid, but also forming an oxide film quickly by performing cathode electrolyzation by applying an electric voltage between the substrate and the counter electrode. The reaction formula with respect to this method is described below taking zirconia as an example.

$$ZrF_6^{2-}+2H_2O \leftrightarrow ZrO_2+4H^++6F^-$$

In the equilibrium reaction, it was found that zirconia is formed when hydrogen ion and fluorine ion are consumed. The zirconia formation rate can be controlled if electrolyzation is used for consuming the ions of hydrogen and fluorine. The coated film, formed using the above-described method, is dense and has little defects, which provides an excellent corrosion resistance compared to the conventional coated film, and is equivalent to or superior to that provided by conventional chromate treatment. However, since another important effect resulting from chromate treatment, i.e., good resin-adhesiveness, has not been developed yet, urgent development has been desired.

As described above, with respect to a coated film formed by the chromate-free treatment method, the adhesiveness between the coated film and the resin layer formed on the coated film (resin-adhesiveness) has not been sufficiently studied and a coated film providing excellent resin adhesiveness has not been obtained yet. For example, according to an investigation by the inventors, it was found that the coated film described in JP-A2000-282256 does not provide sufficient resin adhesiveness under wet conditions. As for the coated film described in JP-A2000-282267, a strong resin layer is expected because the coated film contains a cross-linkable resin to compensate for the poor water-resistance of the hydrophilic resin in order to provide a good film-forming property. However, since it lowers the percent content of zirconium as an inorganic component which provides a barrier function, the corrosion resistance becomes insufficient. As for the coated film described in JP-A2002-50460, high resin-adhesiveness is seemingly expected because the organic resin is added to a vanadium compound. However since fingerprinting resistance is improved by the resin addition, adhesiveness to the organic material such as the resin is lowered. Although a reduced vanadium compound is normally capable of improving corrosion resistance by delocalized corrosion electrons because of its electrical conductivity, the delocalized effect is reduced when the organic resin is mixed, which leads to insufficient resin adhesiveness. As for the coated film described in WO2003/048416, although the corrosion resistance is extremely excellent, since almost no defect can be created at the formation of the coated film, the resin adhesiveness is insufficient in the case of applying a resin layer such as a coating or laminate on the coated film.

SUMMARY OF THE INVENTION

The present invention provides a composite coated metal sheet including a coated film which provides low environmental impact and is free from hexavalent chromium, has good corrosion resistance equivalent to that provided by chromate treatment and has excellent adhesiveness between the coated film and a resin layer formed on the coated film. The present invention also provides a treatment agent for a composite coating and a method of manufacturing a composite coated metal sheet.

After diligent investigation by the inventors to solve the above-mentioned problems, it was found that if a coated film formed on the surface of plated metal sheet or metal sheet contains an oxide and/or a hydroxide of metal other than chromium and an organic component including a modified and/or unmodified functional group, the plated metal sheet or the metal sheet can have corrosion resistance equivalent to or superior to that provided by chromate treatment and can have an excellent adhesiveness between the coated film and the resin layer formed on the coated film. This invention is made based on this finding.

The gist of this invention is as follows.

(1) A composite coated metal sheet comprising;
a coated film on a surface of a plated metal sheet or metal sheet,
the coated film contains
an oxide and/or a hydroxide of metal other than chromium and,
an organic component comprising modified and/or unmodified functional group(s).

(2) The composite coated metal sheet according to (1), further comprising an organic resin layer or layers on the coated film, wherein the organic resin layer adjacent to the coated film comprises the modified and/or unmodified functional group(s) contained in the coated film.

(3) The composite coated metal sheet according to (1) or (2), wherein an average thickness of the coated film is 5 µm or less.

(4) The composite coated metal sheet according to (1), (2) or (3), wherein the organic component in the coated film is in a concentration of less than 20% by mass.

(5) The composite coated metal sheet according to (1), (2) or (3), wherein the organic component in the coated film is in a concentration of less than 5% by mass.

(6) The composite coated metal sheet according to (1), (2), (3), (4) or (5), wherein, at least one of the functional group(s) contained in the coated film is a polar radical, C—C double bond or C—C triple bond.

(7) The composite coated metal sheet according to (1), (2), (3), (4), (5) or (6), wherein at least one of the functional group(s) contained in the coated film is a carboxyl group.

(8) The composite coated metal sheet according to (1), (2), (3), (4), (5), (6) or (7), wherein the metal other than chromium is at least one selected from the group consisting of zirconium, titanium or silicon.

(9) The composite coated metal sheet according to (1), (2), (3), (4), (5), (6) or (7), wherein the metal other than chromium is zirconium.

(10) A treatment agent for preparing a composite coated metal sheet comprising;
an aqueous solution comprising first aqueous solution where a metal ion other than chromium ion and a fluorine ion in a molar ratio of fluorine ion to metal ion of six or more and/or second aqueous solution containing a complex ion containing a metal ion other than chromium ion and fluorine in a molar ratio of fluorine to metal ion of six or more, wherein the aqueous solution further comprises an organic component containing a modified and/or unmodified functional group.

(11) The treatment agent for preparing a composite coated metal sheet according to (10), wherein the organic component is in a concentration of less than 20% by mass.

(12) The treatment agent for preparing a composite coated metal sheet according to (10), wherein the organic component is in a concentration of less than 5% by mass.

(13) The treatment agent for preparing a composite coated metal sheet according to (11) or (12), wherein the aqueous solution containing the organic component has a pH in the range of 2 to 7.

(14) The treatment agent for preparing a composite coated metal sheet according to (11), (12) or (13), wherein the functional group is a polar radical, C—C double bond or C—C triple bond.

(15) The treatment agent for preparing a composite coated metal sheet according to (11), (12) or (13), wherein the functional group is a carboxyl group.

(16) The treatment agent for preparing a composite coated metal sheet according to (10), (11), (12), (13), (14) or (15), wherein the metal ion other than chromium ion is at least one selected from the group consisting of zirconium ion, titanium ion or silicon ion.

(17) The treatment agent for preparing a composite coated metal sheet according to (10), (11), (12), (13), (14) or (15), wherein the metal ion other than chromium ion is zirconium ion.

(18) A method of manufacturing a composite coated metal sheet comprising steps of, contacting a metal sheet or a plated metal sheet with the treatment agent according to (10), (11), (12), (13), (14), (15), (16) or (17) to form a coated film on the metal sheet or the plated metal sheet, wherein the coated film contains an oxide and/or a hydroxide of metal other than chromium and an organic component containing a modified and/or unmodified functional group.

(19) A method of manufacturing a composite coated metal sheet comprising steps of, (a) dipping a metal sheet or a plated metal sheet in the treatment agent according to (10), (11), (12), (13), (14), (15), (16) or (17), (b) applying electrolyzation to the metal sheet or the plated metal sheet to form a coated film on the metal sheet or the plated metal sheet, the coated film containing an oxide and/or a hydroxide of metal other than chromium and an organic component containing a modified and/or unmodified functional group.

(20) The method of manufacturing according to (18) or (19), further comprising a step of forming a organic resin layer on the coated film formed on the surface of the metal sheet or the plated metal sheet.

The present invention includes a composite coated metal sheet on which is formed a coated film which provides low environmental impact free from hexavalent chromium, and which has good corrosion resistance and excellent resin-adhesiveness between the coated film and a resin layer formed on the coated film. The present invention further includes a treatment agent for making the composite coated metal sheet and a method of manufacturing the composite coated metal sheet. Further, since the composite coated metal sheet of the present invention has good corrosion resistance and an excellent resin-adhesiveness, it is possible to make a suitable metal sheet having a variety of coatings and/or resin laminate thereon.

DETAILED DESCRIPTION OF THE INVENTION

Preferred nonlimiting embodiments of the present invention are now described in detail.

FIG. 1a is a side view of a coated metal sheet whose coated film contains a low amount of an inorganic component. The coated film on the metal is made by a conventional method where the metal sheets are dried and baked after the treatment agent has been applied to the substrate. If the treatment agent contains a low amount of the inorganic component, it is not necessary to heat the metal to temperatures reaching several hundred degrees Celsius. However, the coated film has a low barrier function property because the coated film contains low concentration of the inorganic component.

FIG. 1b is a side view of a two layered composite coated metal sheet whose lower layer (coated film) contains a high amount of inorganic component. The lower layer (coated film) on the metal is made by a conventional method where the metal sheets are dried and baked after the treatment agent has been applied on the substrate. The upper layer is constructed by applying a resin on the lower layer. If the treatment agent contains a high amount of the inorganic component, it is necessary to heat the metal to temperatures reaching several hundred degrees Celsius in order to form the film. The lower layer (coated film) has a property of a high barrier function because the lower layer (coated film) contains a high amount of the inorganic component. However, it is difficult to improve the resin-adhesiveness between the lower layer (coated film) and the upper layer (resin) in view of the fact that it is difficult to contain the organic component during the high temperature baking.

Figure 3:
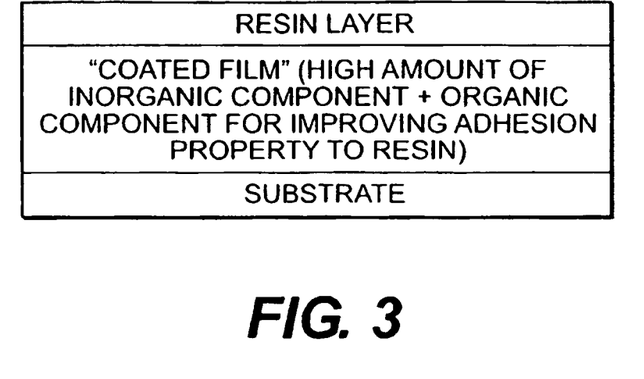
FIG. 3 is a side view of a two layered composite coated metal sheet whose lower layer (coated film) contains both a high amount of inorganic component and an organic component.

FIG. 3 is a side view of a two layered composite coated metal sheet whose lower layer (coated film) contains both a high amount of inorganic component and an organic component. The lower layer (coated film), which is constructed by an electrochemical precipitation, can comprise both a high concentration of an inorganic component and an organic component. The upper layer is constructed of resin. It is easy to improve the resin-adhesiveness between the lower layer (coated film) and the upper layer (resin) in view of the fact that it is easy to contain the organic component without decreasing the amount of the inorganic component because the film layer is constructed by an electrochemical precipitation at ordinary temperatures and not by baking at more than several hundred degrees Celsius.

Figure 2:
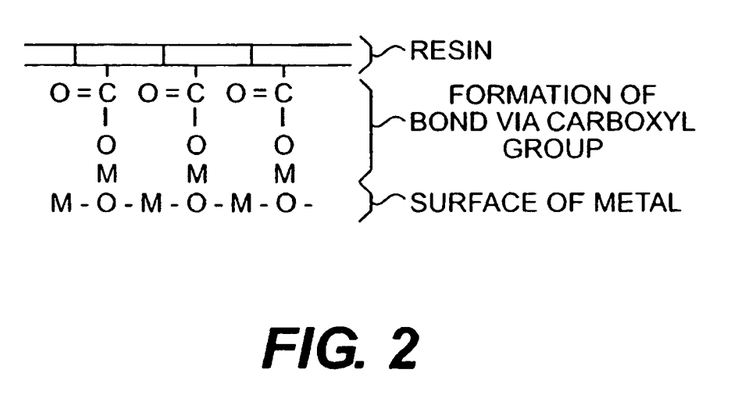
FIG. 2 is a representation of the molecular structure showing the bonding between the resin and the surface of the metal sheet of this invention.

A composite coated metal sheet provided by the present invention comprises a coated film formed on a surface of metal sheet, the coated film containing an oxide and/or a hydroxide of metal other than chromium and, an organic component comprising modified and/or unmodified functional group(s). After diligent investigation by the inventors, it was found that if a coated film formed on the surface of plated metal sheet or metal sheet contains an oxide and/or hydroxide of a metal other than chromium and an organic component including a modified and/or unmodified functional group, the plated metal sheet or the metal sheet can having excellent adhesiveness between the coated film and a resin layer formed on the coated film. Although the mechanism giving the excellent adhesiveness is not clear, the inventors theorize it is because (1) the oxide and/or hydroxide of the metal has a strong chemical bond with the organic resin layer formed thereon and (2) the oxide and/or hydroxide of metal has another strong chemical bond with the organic resin layer formed thereon via the above-mentioned functional group. (See FIG. 2)

In particular, high corrosion resistance and extremely excellent resin-adhesiveness are obtained when the aforementioned organic component exists in the coated film of the metal oxide and/or hydroxide which is made by dipping the metal substrate in an aqueous solution of a complex ion including a fluorine ion and a metal ion other than a chromium ion and by performing a cathode electrolyzation by applying an electric voltage between the substrate and the counter electrode. An organic component can be contained in the coated film by dissolving an organic component (described later) in the complex ion aqueous solution containing fluorine ion and metal ion other than a chromium ion and performing a cathode electrolyzation as mentioned above to form the coated film. A co-electrodeposition mechanism, although possible, is not clearly followed in the electrolyzation between the metal oxide and/or hydroxide and the organic component containing a modified and/or unmodified functional group. However the inventors theorize that each of them independently exists in the treatment liquid and the organic component can be introduced into the coated film without losing its functionality. (See FIG. 3)

It was also found that if the organic resin layer formed on the coated film on metal sheet contains the same kind of functional group as in the coated film, the resin-adhesiveness can be even more enhanced. It may be because the chemical bond is strengthened compared to the above-mentioned bond or the increase in the number of bonds that the functional group is involved in. The functional group can be modified (or denatured) when it forms various chemical bonds through such reactions as oxidation, reduction, or condensation which may occur in the process of forming the coated film which requires preparation of the treatment liquid with a pH change and/or heat treatment, or ion replacement (where a part of ions constituting the functional group is replaced).

The average thickness of the coated film containing a metal oxide and/or metal hydroxide is preferably 5 μm or less. If the thickness increases beyond 5 μm, the resin-adhesiveness with resin layer formed on the coated film does not further increase and so it becomes uneconomical, and in fact the resin-adhesiveness may be reduced when the metal sheet is worked. The average thickness is defined as an averaged value of measurements taken at any 10 fields of view by observing sections of the coated film at a magnification of 1,000-200,000 using SEM (Scanning Electron Microscope) or TEM (Transmission Electron Microscope). A lower limit of the average thickness is a monomolecular layer.

An organic resin layer formed on the coated film containing oxide and/or hydroxide of metal is not limited to a specific resin. The following materials, for example, can be used as the resin, i.e., electron beam curable resin, UV curable resin, polyester resin, acrylic resin, epoxy resin, polyurethane resin, fluorocarbon polymer, silicon-polyester resin, vinyl chloride resin, polyolefin resin, butyral resin, polycarbonate resin, polyamide resin, polystyrene resin, polyimide resin, phenolic resin, or resins formed by cross-linking any of combination of these resins with a cross-linking agent component of butylated melamine, methylated melamine, butyl-methyl mixed melamine, urea resin, isocyanate or mixtures thereof or any other resin containing an appropriate functional group.

The organic resin layer can contain a additive such as a coloring pigment, dye stuff, luster/gloss adjusting agents such as silica, surface smoothing agent, ultraviolet absorber, hindered amine type light stabilizer, viscosity modifier, curing catalyst, pigment dispersant, sedimentation inhibitor, antiflooding agent, corrosion inhibitor, antioxidant or carbon black powder. The additive can be used as a single additive or a combination of different additives. It is desired to select an environmentally friendly product. As for the formation of the organic resin layer, any method, for example application or laminate, can be used.

As for an organic component in the coated film containing oxide and/or hydroxide of metal, it is preferable to include the following functional groups, i.e., a polar radical wherein a carbon atom is bonded to an oxygen atom, nitrogen atom, sulfur atom, phosphorus atom or halogen atom, or C—C double or triple bond. Specific examples include: carboxyl group, ester group, formyl group, hydroxyl group, epoxy group, acid anhydride group, carbonyl group, phosphoric group, amino group, amide group, imino group, thiol group, urea group, alkyl fluoride group, alkyl chloride group, alkyl bromide group, aryl group, alkenyl group, alkynyl group, ether group and nitrile group; preferably carboxyl group, ester group, hydroxyl group, epoxy group, acid anhydride group, carbonyl group, phosphoric group, amino group, thiol group, and urea group. The organic component includes at least one of the above-mentioned functional groups and can be modified. The number of functional groups is one or more. As for the number of types of organic components and the number of functional groups to be contained in the coated film, there is no limitation, as long as resin-adhesiveness can be improved. As for the organic component, there is no limitation as long as it is water-soluble and it does not adversely affect the corrosion resistance and/or resin-adhesiveness by reacting with the aqueous solution where metal ion and fluorine ion co-exist, or by reacting with the aqueous solution including complex ion containing metal ion and fluorine. When the concentration of the organic component in the coated film containing the metal oxide and/or metal hydroxide is less than 20% by mass, i.e., (organic component in the coated film)/(total solid amount of the coated film)×100%, both resin-adhesiveness and corrosion resistance are improved. The concentration of the organic component is more preferably less than 10% and furthermore preferably less than 5%. The mechanism of how the concentration affects the function of the organic component is not clear. However the inventors theorize that the resin-adhesiveness seems to depend on the interaction between the inorganic component and the organic component, and as for corrosion resistance some percentage of the inorganic component functions as a barrier film. The percent (%) by mass is obtained by infrared spectroscopy (ATR method) of the coated film or ICP emission spectroscopic analysis of aqueous solution of the coated film. In the values reported herein, ICP emission spectroscopic analysis is used.

As for the type of metal of the metal oxide or metal hydroxide contained in the coated film formed on the metal sheet of the invention, examples of metals which can be used include iron, magnesium, niobium, tantalum, aluminum, nickel, cobalt, titanium, and zirconium. The coated film can be formed with only one kind of metal, or it can be formed with composite metal, mixed or laminated of more than two kinds of metals. Particularly preferred metals are titanium, zirconium and/or silicon. The inventors of the invention prefer these metals because it is theorized that the oxide or hydroxide of titanium, zirconium and silicon have a strong chemical bond with the organic resin formed thereon or with organic resin layer via functional group. Zirconium can form the best bond.

A treatment agent for making the composite coated metal sheet is now described. The following equilibrium reaction between metal ion and metal oxide is kept in the aqueous solution as previously described.

$$ZrF_6^{2-} + 2H_2O \leftrightarrow ZrO_2 + 4H^+ + 6F^-$$

There are two types of aqueous solutions suitable for the left hand side of the equilibrium equation. One is an aqueous solution, which comprises $Zr^{4+}$ and $6F^-$ that may form $ZrF_6^{2-}$ for example, which comprises a metal ion other than chromium ion and a fluorine ion in a ratio of metal ion to fluorine ion of six or more. The other is an aqueous solution, which comprises $ZrF_6^{2-}$ for example, which comprises a complex ion containing a metal ion other than chromium ion and fluorine in a ratio of metal ion to fluorine of six or more. With at least one of these aqueous solutions, there is an equilibrium reaction between the metal ion and metal oxide based on the equilibrium equation. An amount of coated film or status of the coated film depends on kind of metal ion even if the metal ion concentration is the same. It's because the optimum concentration for forming the film depends on the kind of metal ion. The fluorine ion is to be fed as hydrofluoric acid or salt thereof such as, for example, ammonium salt, potassium salt or sodium salt. The complex ion containing a metal ion other than chromium ion and fluorine in a molar ratio of six or more metal ion to fluorine is to be fed as hexafluorotitanate, hexafluoroniobate, hexafluorotantalate, hexafluorozirconate, or salt of each of them such as, for example, ammonium salt, potassium salt or sodium salt. Elements other than metal and fluorine can be contained in the complex ion. When a salt is used, the concentration range depends on the type of salt used since the saturated solubility varies depending on the kind of cation in the salt. If the molar ratio of the fluorine ion to metal ion is less than six, the coated film formation can still be made, but the resin-adhesiveness may be unstable. The reason for this is still unclear.

The inventors of the invention theorize that if the fluorine ion and hydrogen ion are consumed and reduced, more metal ion can be changed to metal oxide. The appropriate pH value of the treatment agent was then researched. It was found that when the treatment agent (liquid) is used, the preferred pH ranges from 2 to 7, and more preferably ranges from 2 to 5. If the pH is less than 2, the coated film can be formed, but the amount of the film is unstable. If the pH is greater than 7, the treatment liquid becomes unstable so that some aggregation may precipitate.

The concentration of the organic component contained in the treatment agent for making the composite coated metal sheet is preferably less than 20% by mass. If the concentration of the organic component is 20% or more, the amount in the coated film also becomes 20% or more, which lowers the corrosion resistance and resin-adhesiveness compared to the coated film including less than 20% organic component. The amount which is transferred to the coated film depends on the method of film formation and the conditions. The pH of the treatment agent can be adjusted by any well known method. As for the precipitation reaction and other conditions, there is no specific limitation. Manufacturing of the composite coated metal sheet is made by making the metal sheet contact the above-mentioned treatment liquid, and it is preferred to dip the metal sheet in the treatment liquid and apply electrolyzation. The reaction temperature and time can be appropriately selected. The current density for the electrolyzation preferably ranges from 0.1 A/dm$^2$ to 50 A/dm$^2$. The reaction temperature is normally room temperature to 80° C. The reaction time of the electrolyzation should be determined according to the desired amount of coated film, but the shorter time is economically better and normally less than 60 min. is preferable. Also, degreasing and descaling the surface of metal sheet is recommended.

As for the metal sheet and/or plated metal sheet of the invention, a variety of metals and alloys are available. For example, cold-rolled steel sheet, stainless steel sheet, aluminum-aluminum alloy sheet, titanium sheet, magnesium-magnesium alloy sheet, galvanized steel sheet, tinned steel sheet and nickel plated steel sheet are available.

EXAMPLES

The present invention is more specifically set forth in the following description with reference to the examples. However, the scope of the invention is not limited by the examples. Tables 1-11 shows conditions. As a metal sheet, cold-rolled steel sheet, electrogalvanized steel sheet, hot dip galvanized steel sheet, hot dip aluminum steel sheet, alloyed galvanized steel sheet, tinned steel sheet, nickel plated steel sheet, aluminum sheet, SUS304 sheet, Zn—Ni electroplated steel sheet are used. These sheets are degreased by ultrasonic degreasing in acetone solvent before used for experiment.

The following is a description of the treatment agent comprising an organic component including a modified and/or unmodified functional group, and an oxide and/or hydroxide of metal other than chromium. The organic component having a functional group is added to the aqueous solution of the hexafluoro complex salt with titanium, zirconium or silicon or an aqueous solution of a mixture of ammonium hydrogen fluoride and chloride salt of titanium, zirconium or silicon. Further the pH is adjusted by using aqueous ammonia or hydrofluoric acid to prepare the treatment agent. As for the organic component having a functional group, polyacrylic acid for carboxyl group, 2-ethylhexyl acrylate for ester group and 2,3-epoxypropyl methacrylate for epoxy group are used.

After degreasing, the metal sheet is contacted with the treatment agent for 10 seconds—30 minutes to form a coated film and is washed with water and dried. Alternatively, the metal sheet is subjected to a cathode electrolyzation by applying electric voltage between the metal sheet and the counter electrode of platinum for 10 seconds—30 minutes at the current of 100 mA/cm$^2$. After a coated film is formed, the metal sheet is water-washed and dried.

Table 1 shows conditions for preparing each of the test samples. As for Experiment Nos. 1-10, the treatment agent is prepared as follows. An aqueous solution of 0.1 mol/L ammonium hexafluorotitanate is combined with an organic component which is added so as to become predetermined amount in a coated film and the pH of the solution is adjusted to 4. A substrate (metal sheet) is dipped in the treatment agent and subjected to electrolyzation to form a coated film. As for Experiment Nos. 11-20, the treatment agent is prepared as follows. An organic component is added to an aqueous solution of 0.1 mol/L ammonium hexafluorozirconate so as to become a predetermined amount in a coated film and the pH is adjusted to 4. A substrate (metal sheet) is dipped in the treatment agent and subjected to electrolyzation to form a coated film. As for Experiment Nos. 21-30, the treatment agent is prepared as follows. An organic component is added to an aqueous solution of 0.1 mol/L ammonium hexafluorosilicate so as to become a predetermined amount in a coated film and the pH of the solution is adjusted to 4. A substrate (metal sheet) is dipped in the treatment agent and subjected to electrolyzation to form a coated film. The thickness of the coated film is controlled by adjusting the amount of time spent forming the film. These coated films are examined by X-ray photoelectron spectroscopy and infrared spectroscopy to confirm that the formed coated film contains oxide of the metal and hydroxide of the metal with the organic component. Nos. 31 and 32 are comparison examples. No. 31 is a test sample which is coated with an application type chromate treatment agent so that the amount of chromium that attaches is 20 mg/m$^2$ and then the sample is dried. No. 32 sample is subjected to only degreasing. The corrosion resistance estimation test is made as follows. An aqueous solution of 5% by mass NaCl at 35° C. is sprayed onto a flat part of the test sample. After 72 hours pass, the percentage of the formation of white rust is measured. The result is estimated by 4 levels. A score of 2 or more is good.

4: white rust formation percentage 0%
3: white rust formation percentage less than 5%
2: white rust formation percentage 5 to less than 20%
1: white rust formation percentage more than 20%

The results are shown in Table 1.

TABLE 1

| | 60 g/m² hot dipped galvanized steel sheet | | | | | |
|---|---|---|---|---|---|---|
| | oxide, hydroxide coated film | | | | result flat part | |
| Run No. | metal | thickness (µm) | organic component functional group | mass % | corrosion resistance | note |
| 1 | titanium | 5 | carboxy | 10 | 4 | example |
| 2 | | 3 | | 10 | 4 | |
| 3 | | 1 | | 10 | 3 | |
| 4 | | 1 | | 5 | 3 | |
| 5 | | 1 | | 3 | 3 | |
| 6 | | 1 | | 1 | 3 | |
| 7 | | 1 | | 0.1 | 3 | |
| 8 | | 1 | | 0.01 | 3 | |
| 9 | | 0.1 | | 10 | 2 | |
| 10 | | 0.01 | | 10 | 2 | |
| 11 | zirconium | 5 | ester | 10 | 4 | |
| 12 | | 3 | | 10 | 4 | |
| 13 | | 1 | | 10 | 3 | |
| 14 | | 1 | | 5 | 3 | |
| 15 | | 1 | | 3 | 3 | |
| 16 | | 1 | | 1 | 3 | |
| 17 | | 1 | | 0.1 | 3 | |
| 18 | | 1 | | 0.01 | 3 | |
| 19 | | 0.1 | | 10 | 2 | |
| 20 | | 0.01 | | 10 | 2 | |
| 21 | silicon | 5 | epoxy | 10 | 4 | |
| 22 | | 3 | | 10 | 4 | |
| 23 | | 1 | | 10 | 3 | |
| 24 | | 1 | | 5 | 3 | |
| 25 | | 1 | | 3 | 3 | |
| 26 | | 1 | | 1 | 3 | |
| 27 | | 1 | | 0.1 | 3 | |
| 28 | | 1 | | 0.01 | 3 | |
| 29 | | 0.1 | | 10 | 2 | |
| 30 | | 0.01 | | 10 | 2 | |
| 31 | | chromate treatment | | | 2 | comparison |
| 32 | | non-treatment | | | 1 | |

As for Experiment Nos. 33-42 of Table 2 and Experiment Nos. 69-78 of Table 5, the treatment agent, is prepared as follows. An organic component is added to an aqueous solution of 0.1 mol/L ammonium hexafluorotitanate so as to become predetermined amount in a coated film and the pH of the solution is adjusted to 4. A substrate (metal sheet) is dipped in the treatment agent and subjected to electrolyzation to form a coated film.

As for Experiment Nos. 45-54 of Table 3, Experiment Nos. 81-90 of Table 6 and Experiment Nos. 105-114 of Table 8, the treatment agent is prepared as follows. An organic component is added to an aqueous solution of 0.1 mol/L ammonium hexafluorozirconate so as to become predetermined amount in a coated film and the pH of the solution is adjusted to 4. A substrate (metal sheet) is dipped in the treatment agent and subjected to electrolyzation to form a coated film.

As for Experiment Nos. 57-66 of Table 4, Experiment Nos. 93-102 of Table 7 and Experiment Nos. 117-126 of Table 9, the treatment agent is prepared as follows. An organic component is added to an aqueous solution of 0.1 mol/L ammonium hexafluorosilicate so as to become predetermined amount in a coated film and the pH of the solution is adjusted to 4. A substrate (metal sheet) is dipped in the treatment agent and subjected to electrolyzation to form a coated film.

The thickness of the coated film is controlled by the amount of time spent forming the film. These coated films were examined by X-ray photoelectron spectroscopy and infrared spectroscopy to confirm that the formed coated film contains an oxide of metal and hydroxide of metal with the organic component. Nos. 43, 55, 67, 79, 91, 103, 115 and 127 of Tables 2-9 are comparison examples where the test samples were coated with an application type chromate treatment agent so that attached amount of chromium is 20 mg/m² and dried. Sample Nos. 44, 56, 68, 80, 92, 104, 116 and 128 of Tables 2-9 were subjected to only degreasing.

The organic resin layer to be formed on the coated film of metal sheet is formed as follows. As for Example Nos. 33-44, acrylic emulsion is applied on the test samples and dried to form an acrylic resin layer. As for Example Nos. 45-56 and 69-80, an aqueous urethane resin is applied on the test samples and dried to form an urethane resin layer. As for Example Nos. 57-68, an epoxy emulsion is applied on the test samples and dried to form an epoxy resin layer. As for Example Nos. 81-92, a polyethylene terephthalate resin film is thermocompressed on the test samples. As for Example Nos. 93-104, an ethylene-methacrylate copolymer film is thermocompressed. As for Example Nos. 105-116, an ethylene-acrylate copolymer film is thermocompressed. As for Example Nos. 117-128, an ethylene-vinyl acetate copolymer film is thermocompressed. The thickness of the organic resin layer formed on all of the test samples was 15 µm. The emulsion of acrylic ester/acrylic acid copolymer is used as an acrylic emulsion, and the emulsion of a self-emulsifying type polyurethane resin is used as an aqueous urethane resin, and a bisphenol-F type is used as the epoxy resin emulsion.

The secondary adhesive property to resin is defined as being the resin-adhesiveness at humid atmosphere, is estimated as follows. After soaking the test sample in boiling water for 60 minutes, the resin layer is cross-cut to form a grid pursuant to JIS K 5400 and perform Ericksen processing by 7 mm. Sticky tape (CELLOPHANE tape, a trademark of Nichiban) is stuck on the processed part and is quickly pulled up in a 45° direction to try to peel off the resin layer. The number of grids peeled off out of 100 is counted. An estimation is made depending on the degree of peelings and is categorized in 5 levels. The estimation is as follows. A score of 3 or more is good.
5: peeling 0%
4: percentage of peeled area is less than 25%
3: percentage of peeled area is more than 25% less than 50%
2: percentage of peeled area is more than 50% less than 75%
1: percentage of peeled area is more than 75%

The corrosion resistance of processed part is defined as being the corrosion resistance of a cut section of a metal sheet and is estimated as follows. All the test samples are prepared so as to have burr formed at the edge by cutting in the same positions, i.e., uppermost and lowermost positions. Pursuant to JIS H 8502, 180 times of the following cycle is carried out 180 times and an estimation is made based on the maximum swollen width of the layer from the cut-end of the test sample and is categorized in 5 levels. A score of 2 or more is good.
Cycle:
The cycle involves first spraying with a neutral salt water spray (5 mass % NaCl aqueous solution spray 2 hours)→drying (60° C., RH 20%-30%, 4 hours)→moistening (50° C., RH 95% or more)
5: no swelling
4: maximum swelling width is less than 3 mm
3: maximum swelling width is more than 3 mm to less than 6 mm
2: maximum swelling width is more than 6 mm to less than 9 mm
1: maximum swelling width more than 9 mm

TABLE 2 cold-rolled steel sheet

| | | | | | | result | | |
|---|---|---|---|---|---|---|---|---|
| | | oxide, hydroxide coated film | | | | corrosion resistance of | secondary adhesion | |
| Run | | thickness | organic component | | | processed | property | |
| No. | metal | (μm) | functional group | mass % | organic resin layer | part | to resin | note |
| 33 | titanium | 5 | carboxy | 10 | acrylic resin | 4 | 4 | example |
| 34 | | 3 | | 10 | | 4 | 4 | |
| 35 | | 1 | | 10 | | 4 | 4 | |
| 36 | | 1 | | 5 | | 4 | 4 | |
| 37 | | 1 | | 3 | | 4 | 4 | |
| 38 | | 1 | | 1 | | 4 | 4 | |
| 39 | | 1 | | 0.1 | | 4 | 4 | |
| 40 | | 1 | | 0.01 | | 4 | 4 | |
| 41 | | 0.1 | | 10 | | 4 | 4 | |
| 42 | | 0.01 | | 10 | | 4 | 4 | |
| 43 | | chromate treatment | | | | 4 | 4 | comparison |
| 44 | | non-treatment | | | | 1 | 1 | |

TABLE 3

20 g/m$^2$ electrogalvanized steel sheet

| | | | | | | result | | |
|---|---|---|---|---|---|---|---|---|
| | | oxide, hydroxide coated film | | | | corrosion resistance of | secondary adhesion | |
| Run | | thickness | organic component | | | processed | property | |
| No. | metal | (μm) | functional group | mass % | organic resin layer | part | to resin | note |
| 45 | zirconium | 5 | ester | 10 | urethane resin | 4 | 4 | example |
| 46 | | 3 | | 10 | | 4 | 4 | |
| 47 | | 1 | | 10 | | 4 | 4 | |
| 48 | | 1 | | 5 | | 4 | 4 | |
| 49 | | 1 | | 3 | | 4 | 5 | |
| 50 | | 1 | | 1 | | 4 | 5 | |
| 51 | | 1 | | 0.1 | | 4 | 4 | |
| 52 | | 1 | | 0.01 | | 4 | 4 | |
| 53 | | 0.1 | | 10 | | 4 | 4 | |
| 54 | | 0.01 | | 10 | | 4 | 4 | |
| 55 | | chromate treatment | | | | 4 | 4 | comparison |
| 56 | | non-treatment | | | | 1 | 1 | |

TABLE 4

60 g/m² hot dip galvanized steel sheet

| | oxide, hydroxide coated film | | | | result | | |
|---|---|---|---|---|---|---|---|
| | | | organic component | | corrosion resistance of | secondary adhesion | |
| Run No. | metal | thickness (μm) | functional group | mass % | organic resin layer | processed part | property to resin | note |
| 57 | silicon | 5 | epoxy | 10 | epoxy resin | 4 | 4 | example |
| 58 | | 3 | | 10 | | 4 | 4 | |
| 59 | | 1 | | 10 | | 4 | 4 | |
| 60 | | 1 | | 5 | | 4 | 4 | |
| 61 | | 1 | | 3 | | 4 | 5 | |
| 62 | | 1 | | 1 | | 4 | 5 | |
| 63 | | 1 | | 0.1 | | 4 | 4 | |
| 64 | | 1 | | 0.01 | | 4 | 4 | |
| 65 | | 0.1 | | 10 | | 4 | 4 | |
| 66 | | 0.01 | | 10 | | 4 | 4 | |
| 67 | chromate treatment | | | | | 4 | 4 | comparison |
| 68 | non-treatment | | | | | 1 | 1 | |

TABLE 5

60 g/m² hot dipped aluminum-plated steel sheet

| | oxide, hydroxide coated film | | | | result | | |
|---|---|---|---|---|---|---|---|
| | | | organic component | | corrosion resistance of | secondary adhesion | |
| Run No. | metal | thickness (μm) | functional group | mass % | organic resin layer | processed part | property to resin | note |
| 69 | titanium | 5 | carboxy | 10 | urethane resin | 4 | 4 | example |
| 70 | | 3 | | 10 | | 4 | 4 | |
| 71 | | 1 | | 10 | | 4 | 4 | |
| 72 | | 1 | | 5 | | 4 | 4 | |
| 73 | | 1 | | 3 | | 4 | 5 | |
| 74 | | 1 | | 1 | | 4 | 5 | |
| 75 | | 1 | | 0.1 | | 4 | 4 | |
| 76 | | 1 | | 0.01 | | 4 | 4 | |
| 77 | | 0.1 | | 10 | | 4 | 4 | |
| 78 | | 0.01 | | 10 | | 4 | 4 | |
| 79 | chromate treatment | | | | | 4 | 4 | comparison |
| 80 | non-treatment | | | | | 1 | 1 | |

TABLE 6

60 g/m² alloyed hot dip galvanized steel sheet

| | oxide, hydroxide coated film | | | | result | | |
|---|---|---|---|---|---|---|---|
| | | | organic component | | corrosion resistance of | secondary adhesion | |
| Run No. | metal | thickness (μm) | functional group | mass % | organic resin layer | processed part | property to resin | note |
| 81 | zirconium | 5 | ester | 10 | polyethylene terephthalate resin | 4 | 4 | example |
| 82 | | 3 | | 10 | | 4 | 4 | |
| 83 | | 1 | | 10 | | 4 | 4 | |
| 84 | | 1 | | 5 | | 4 | 4 | |
| 85 | | 1 | | 3 | | 4 | 5 | |
| 86 | | 1 | | 1 | | 4 | 5 | |
| 87 | | 1 | | 0.1 | | 4 | 4 | |
| 88 | | 1 | | 0.01 | | 4 | 4 | |
| 89 | | 0.1 | | 10 | | 4 | 4 | |

TABLE 6-continued

| 60 g/m² alloyed hot dip galvanized steel sheet | | | | | | | |
|---|---|---|---|---|---|---|---|
| | | oxide, hydroxide coated film | | | result | | |
| | | | | | corrosion resistance of | secondary adhesion | |
| | | | organic component | | | | |
| Run No. | metal | thickness (μm) | functional group | mass % | organic resin layer | processed part | property to resin | note |
| 90 | | 0.01 | | 10 | | 4 | 4 | |
| 91 | | chromate treatment | | | | 4 | 4 | comparison |
| 92 | | non-treatment | | | | 1 | 1 | |

TABLE 7

| 20 g/m² nickel plated steel sheet | | | | | | | |
|---|---|---|---|---|---|---|---|
| | | oxide, hydroxide coated film | | | | result | |
| | | | | | | corrosion resistance of | secondary adhesion |
| Run No. | metal | thickness (μm) | organic component | | organic resin layer | processed part | property to resin | note |
| | | | functional group | mass % | | | | |
| 93 | silicon | 5 | carboxy | 10 | ethylene-methacrylate copolymer | 4 | 4 | example |
| 94 | | 3 | | 10 | | 4 | 4 | |
| 95 | | 1 | | 10 | | 4 | 4 | |
| 96 | | 1 | | 5 | | 4 | 4 | |
| 97 | | 1 | | 3 | | 4 | 5 | |
| 98 | | 1 | | 1 | | 4 | 5 | |
| 99 | | 1 | | 0.1 | | 4 | 4 | |
| 100 | | 1 | | 0.01 | | 4 | 4 | |
| 101 | | 0.1 | | 10 | | 4 | 4 | |
| 102 | | 0.01 | | 10 | | 4 | 4 | |
| 103 | | chromate treatment | | | | 4 | 4 | comparison |
| 104 | | non-treatment | | | | 1 | 1 | |

TABLE 8

| 2 g/m² tinned steel sheet | | | | | | | |
|---|---|---|---|---|---|---|---|
| | | oxide, hydroxide coated film | | | | result | |
| | | | | | | corrosion resistance of | secondary adhesion |
| Run No. | metal | thickness (μm) | organic component | | organic resin layer | processed part | property to resin | note |
| | | | functional group | mass % | | | | |
| 105 | zirconium | 5 | carboxy | 10 | ethylene-acrylate copolymer | 4 | 4 | example |
| 106 | | 3 | | 10 | | 4 | 4 | |
| 107 | | 1 | | 10 | | 4 | 4 | |
| 108 | | 1 | | 5 | | 4 | 4 | |
| 109 | | 1 | | 3 | | 4 | 5 | |
| 110 | | 1 | | 1 | | 4 | 5 | |
| 111 | | 1 | | 0.1 | | 4 | 4 | |
| 112 | | 1 | | 0.01 | | 4 | 4 | |
| 113 | | 0.1 | | 10 | | 4 | 4 | |
| 114 | | 0.01 | | 10 | | 4 | 4 | |
| 115 | | chromate treatment | | | | 4 | 4 | comparison |
| 116 | | non-treatment | | | | 1 | 1 | |

TABLE 9 aluminum sheet

| | | oxide, hydroxide coated film | | | result | | |
|---|---|---|---|---|---|---|---|
| | | | | | corrosion resistance of | secondary adhesion | |
| Run | metal | thickness | organic component | organic resin | processed | property | note |
| No. | | (μm) | functional group | mass % | layer | part | to resin | |
| 117 | silicon | 5 | carboxy | 10 | ethylene- | 4 | 4 | example |
| 118 | | 3 | | 10 | vinyl acetate | 4 | 4 | |
| 119 | | 1 | | 10 | copolymer | 4 | 4 | |
| 120 | | 1 | | 5 | | 4 | 4 | |
| 121 | | 1 | | 3 | | 4 | 5 | |
| 122 | | 1 | | 1 | | 4 | 5 | |
| 123 | | 1 | | 0.1 | | 4 | 4 | |
| 124 | | 1 | | 0.01 | | 4 | 4 | |
| 125 | | 0.1 | | 10 | | 4 | 4 | |
| 126 | | 0.01 | | 10 | | 4 | 4 | |
| 127 | | chromate treatment | | | | 4 | 4 | comparison |
| 128 | | non-treatment | | | | 1 | 1 | |

As for Experiment Nos. 129-136 of Table 10, the treatment agent is prepared as follows. An organic component is added to an aqueous solution of 0.1 mol/L ammonium hexafluorotitanate in an amount of 1% by mass and the pH is adjusted to the pH number given in Table 10. A SUS (cold-rolled stainless steel sheet) substrate is dipped in the treatment agent and subjected to electrolyzation to form a coated film.

As for Experiment Nos. 137-144 of Table 10, the treatment agent is prepared as follows. An organic component is added to an aqueous solution of 0.1 mol/L ammonium hexafluorozirconate in an amount of 1% by mass and the pH is adjusted to the pH value described in Table 10. A SUS substrate is dipped in the treatment agent and subjected to electrolyzation to form a coated film.

As for Experiment Nos. 145-152 of Table 10, the treatment agent is prepared as follows. An organic component is added to an aqueous solution of 0.1 mol/L ammonium hexafluorosilicate in an amount of 1% by mass and the pH is adjusted to the pH value given in Table 10. A SUS substrate is dipped in the treatment agent and subjected to electrolyzation to form a coated film.

As for Experiment Nos. 153-158 of Table 10, the treatment agent is prepared as follows. An aqueous solution of mixture of ammonium hydrogen fluoride and titanium chloride having a titanium-fluorine molar ratio as described in Table 10 and the pH of the solution is adjusted to 4. A SUS substrate is dipped in the treatment agent and subjected to electrolyzation to form a coated film.

As for Experiment Nos. 161-168 of Table 11, the treatment agent is prepared as follows. An organic component is added to an aqueous solution of 0.1 mol/L ammonium hexafluorotitanate in an amount of 1% by mass and the pH of the solution is adjusted to the pH value described in Table 11. Zn—Ni electroplated steel sheet is dipped in the treatment agent to form a coated film.

As for Experiment Nos. 169-176 of Table 11, the treatment agent is prepared as follows. An organic component is added to an aqueous solution of 0.1 mol/L ammonium hexafluorozirconate in an amount of 1% by mass and the pH of the solution is adjusted to the pH value described in Table 11. Zn—Ni electroplated steel sheet is dipped in the treatment agent to form a coated film.

As for Experiment Nos. 177-184 of Table 11, the treatment agent is prepared as follows. An organic component is added to an aqueous solution of 0.1 mol/L ammonium hexafluorosilicate in an amount of 1% by mass and the pH of the solution is adjusted to the pH value described in Table 11. Zn—Ni electroplated steel sheet is dipped in the treatment agent to form a coated film.

As for Experiment Nos. 185-190 of Table 11, the treatment agent is prepared as follows. An aqueous solution of a mixture of ammonium hydrogen fluoride and titanium chloride having a titanium-fluorine molar ratio as described in Table 10 and the pH of the solution is adjusted to 4. Zn—Ni electroplated steel sheet is dipped in the treatment agent to form a coated film.

These coated films are examined by X-ray photoelectron spectroscopy and infrared spectroscopy to confirm that the formed coated film contains an oxide of metal and hydroxide of metal with the organic component.

No. 159 of Table 10 and No. 191 of Table 11 are comparison examples. Both test samples are coated with application type chromate treatment agent so that the amount of chromium in the coating is 20 mg/m$^2$ and the sample is dried. As comparison examples, No. 160 of Table 10 and No. 192 of Table 11 were subjected to only degreasing.

The organic resin layer to be formed on the coated film of metal sheet is formed as follows. An acrylic emulsion is applied on the test samples and dried to form an acrylic resin layer. The thickness of the organic resin layer formed on all the test samples is 15 μm. The resin-adhesiveness is estimated as follows. After soaking a test sample in boiling water for 60 minutes, the resin layer is cross-cut to form a grid pursuant to JIS K 5400 and Ericksen processing is performed to 7 mm. Sticky tape (CELLOPHANE tape a trademark of Nichiban) is stuck on the processed part and quickly pulled up in a 45° angle to try to peel off the resin layer. The number of grids peeled off out of 100 grids is counted. An estimation is made depending on the degree of peeling at 5 different levels. The estimation is as follows. A score of 3 or more is a good sample.

5: peeling 0%
4: percentage of the peeled area is less than 25%
3: percentage of the peeled area is more than 25% and less than 50%
2: percentage of the peeled area is more than 50% and less than 75%
1: percentage of the peeled area is more than 75%

TABLE 10

SUS304

| Run No. | treatment liquid | pH | organic component mass % | film forming | secondary adhesion property to resin | note |
|---|---|---|---|---|---|---|
| 129 | 0.1 mol/L ammonium hexafluorotitanate | 1 | 1 | electro-lyzation | 2 | example |
| 130 | | 2 | | | 4 | |
| 131 | | 3 | | | 4 | |
| 132 | | 4 | | | 4 | |
| 133 | | 5 | | | 4 | |
| 134 | | 6 | | | 3 | |
| 135 | | 7 | | | 3 | |
| 136 | | 8 | | | 2 | |
| 137 | 0.1 mol/L ammonium hexafluorozirconate | 1 | | | 2 | |
| 138 | | 2 | | | 4 | |
| 139 | | 3 | | | 4 | |
| 140 | | 4 | | | 4 | |
| 141 | | 5 | | | 4 | |
| 142 | | 6 | | | 3 | |
| 143 | | 7 | | | 3 | |
| 144 | | 8 | | | 2 | |
| 145 | 0.1 mol/L ammonium hexafluorosilicate | 1 | | | 2 | |
| 146 | | 2 | | | 4 | |
| 147 | | 3 | | | 4 | |
| 148 | | 4 | | | 4 | |
| 149 | | 5 | | | 4 | |
| 150 | | 6 | | | 3 | |
| 151 | | 7 | | | 3 | |
| 152 | | 8 | | | 2 | |
| 153 | 0.1 mol/L titanium chloride + 0.05 mol/L ammonium hydrogen fluoride (Ti:F (molar ratio) = 1:1) | 4 | | | 2 | |
| 154 | 0.1 mol/L titanium chloride + 0.05 mol/L ammonium hydrogen fluoride (Ti:F (molar ratio) = 1:2) | 4 | | | 2 | |
| 155 | 0.1 mol/L titanium chloride + 0.05 mol/L ammonium hydrogen fluoride (Ti:F (molar ratio) = 1:3) | 4 | | | 2 | |
| 156 | 0.1 mol/L titanium chloride + 0.05 mol/L ammonium hydrogen fluoride (Ti:F (molar ratio) = 1:4) | 4 | | | 3 | |
| 157 | 0.1 mol/L titanium chloride + 0.05 mol/L ammonium hydrogen fluoride (Ti:F (molar ratio) = 1:5) | 4 | | | 3 | |
| 158 | 0.1 mol/L titanium chloride + 0.05 mol/L ammonium hydrogen fluoride (Ti:F (molar ratio) = 1:6) | 4 | | | 4 | |
| 159 | chromate treatment | | | | 4 | comparison |
| 160 | non-treatment | | | | 1 | |

TABLE 11

20 g/m$^2$ electrogalvanized with 12% nickel steel sheet

| Run No. | treatment liquid | pH | organic component mass % | film forming | secondary adhesion property to resin | note |
|---|---|---|---|---|---|---|
| 161 | 0.1 mol/L ammonium hexafluorotitanate | 1 | 1 | contact | 2 | example |
| 162 | | 2 | | | 4 | |
| 163 | | 3 | | | 4 | |
| 164 | | 4 | | | 4 | |
| 165 | | 5 | | | 4 | |
| 166 | | 6 | | | 3 | |
| 167 | | 7 | | | 3 | |
| 168 | | 8 | | | 2 | |
| 169 | 0.1 mol/L ammonium hexafluorozirconate | 1 | | | 2 | |
| 170 | | 2 | | | 4 | |
| 171 | | 3 | | | 4 | |
| 172 | | 4 | | | 4 | |
| 173 | | 5 | | | 4 | |
| 174 | | 6 | | | 3 | |

TABLE 11-continued 20 g/m² electrogalvanized with 12% nickel steel sheet

| Run No. | treatment liquid | pH | organic component mass % | film forming | secondary adhesion property to resin | note |
|---|---|---|---|---|---|---|
| 175 | | 7 | | | 3 | |
| 176 | | 8 | | | 2 | |
| 177 | 0.1 mol/L ammonium hexafluorosilicate | 1 | | | 2 | |
| 178 | | 2 | | | 4 | |
| 179 | | 3 | | | 4 | |
| 180 | | 4 | | | 4 | |
| 181 | | 5 | | | 4 | |
| 182 | | 6 | | | 3 | |
| 183 | | 7 | | | 3 | |
| 184 | | 8 | | | 2 | |
| 185 | 0.1 mol/L titanium chloride + 0.05 mol/L ammonium hydrogen fluoride (Ti:F (molar ratio) = 1:1) | 4 | | | 2 | |
| 186 | 0.1 mol/L titanium chloride + 0.1 mol/L ammonium hydrogen fluoride (Ti:F (molar ratio) = 1:2) | 4 | | | 2 | |
| 187 | 0.1 mol/L titanium chloride + 0.15 mol/L ammonium hydrogen fluoride (Ti:F (molar ratio) = 1:3) | 4 | | | 2 | |
| 188 | 0.1 mol/L titanium chloride + 0.2 mol/L ammonium hydrogen fluoride (Ti:F (molar ratio) = 1:4) | 4 | | | 3 | |
| 189 | 0.1 mol/L titanium chloride + 0.25 mol/L ammonium hydrogen fluoride (Ti:F (molar ratio) = 1:5) | 4 | | | 3 | |
| 190 | 0.1 mol/L titanium chloride + 0.3 mol/L ammonium hydrogen fluoride (Ti:F (molar ratio) = 1:6) | 4 | | | 4 | |
| 191 | chromate treatment | | | | 4 | comparison |
| 192 | non-treatment | | | | 1 | |

All of the results of the experiments are shown in Table 1 through Table 11. With all the examples of the invention, it was found that the metal sheet of the invention has excellent resin-adhesiveness compared to the metal sheet of comparison example and shows excellent corrosion resistance and resin-adhesiveness equivalent to using a chromate treatment. The metal sheet of the present invention does not include hexavalent chromium, even though this has a very light environmental impact compared to chromate treatment.

The invention may be embodied in other specific forms without departing from the spirit of the essential characteristics thereof. The embodiments described herein are therefore to be considered in all respects as illustrative and not restrictive, the scope of the invention being indicated by the appended claims rather than by the foregoing description and all changes which come within the meaning and range of equivalency of the claims are therefore intended to be embraced therein.

All references cited hereinabove are incorporated by reference in their entirety.

The invention claimed is:

1. A composite coated metal sheet comprising;
a coated film on a surface of a plated metal sheet or metal sheet, and
an organic resin layer or layers on the coated film,
wherein the coated film contains
an oxide and/or a hydroxide of metal other than chromium and,
an organic component comprising modified and/or unmodified functional group(s), wherein the coated film is formed by applying cathode electrolyzation, and
wherein the oxide and/or the hydroxide of the metal has a chemical bond with the organic resin layer or layers via the functional group(s).

2. The composite coated metal sheet according to claim 1, wherein the organic resin layer adjacent to the coated film comprises the modified and/or unmodified functional group(s) contained in the coated film.

3. The composite coated metal sheet according to claim 1, wherein the coated film has an average thickness of 5 μm or less.

4. The composite coated metal sheet according to claim 1, wherein the organic component in the coated film is in a concentration of less than 20% by mass.

5. The composite coated metal sheet according to claim 1, wherein the organic component in the coated film is in a concentration of less than 5% by mass.

6. The composite coated metal sheet according to claim 1, wherein at least one of the functional group(s) contained in the coated film is a polar radical, C—C double bond or C—C triple bond.

7. The composite coated metal sheet according to claim 1, wherein at least one of the functional group(s) contained in the coated film is a carboxyl group.

8. The composite coated metal sheet according to claim 1, wherein the metal other than chromium is at least one selected from the group consisting of zirconium, titanium or silicon.

9. The composite coated metal sheet according to claim 1, wherein the metal other than chromium is zirconium.

10. A treatment agent for preparing a composite coated metal sheet comprising:

an aqueous solution comprising;
a first aqueous solution comprising a metal ion other than chromium ion and a fluorine ion in a molar ratio of the fluorine ion to the metal ion of six or more, and/or
a second aqueous solution comprising a complex ion containing a metal ion other than chromium ion and a fluorine ion in a molar ratio of the fluorine ion to the metal ion of six or more times,
wherein the aqueous solution further comprises an organic component containing modified and/or unmodified functional group(s) in a concentration of less than 20% by mass, and
wherein the organic component contains at least one selected from the group consisting of polyacrylic acid, 2-ethylhexyl acrylate, and 2,3-epoxypropyl methacrylate.

11. The treatment agent for preparing a composite coated metal sheet according to claim 10, wherein the organic component is in a concentration of less than 5% by mass.

12. The treatment agent for preparing a composite coated metal sheet according to claim 10, wherein the aqueous solution containing the organic component has a pH in a range of from 2 to 7.

13. The treatment agent for preparing a composite coated metal sheet according to claim 10, wherein the functional group is a polar radical, C—C double bond or C—C triple bond.

14. The treatment agent for preparing a composite coated metal sheet according to claim 10, wherein the functional group is a carboxyl group.

15. The treatment agent for preparing a composite coated metal sheet according to claim 10, wherein the metal ion other than chromium ion is at least one Selected from the group consisting of zirconium ion, titanium on or silicon ion.

16. The treatment agent for preparing a composite coated meta sheet according to claim 10, wherein the metal ion other than chromium ion is zirconium ion.

17. A method of manufacturing a composite coated metal sheet comprising steps of:
contacting a metal sheet or a plated metal sheet with a treatment agent to form a coated film on the metal sheet or the plated metal sheet, Wherein the coated film contains an oxide and/or a hydroxide of metal other than chromium and an organic component containing a modified and/or unmodified functional group; and
forming an organic resin layer on the coated film formed on the surface of the metal sheet or the plated sheet, the oxide and/or the hydroxide of the metal having a chemical bond with the organic resin layer via the functional group,
wherein the treatment agent comprises an aqueous solution comprising:
a first aqueous solution comprising a metal ion other than chromium ion and a fluorine ion in a molar ratio of the fluorine ion to the metal ion of six or more; and/or
a second aqueous solution comprising a complex ion containing a metal ion other than chromium ion and a fluorine ion in a molar ratio of the fluorine ion to the metal ion of six or more times, and
the aqueous solution further comprising an organic component containing modified and/or unmodified functional group(s) in a concentration of less than 20% by mass.

18. A method of manufacturing a composite coated metal sheet comprising steps of:
dipping a metal sheet or a plated metal sheet in a treatment agent;
applying electrolyzation to the metal sheet or the plated metal sheet to form a coated film on the metal sheet or the plated metal sheet, the coated film comprising an oxide and/or a hydroxide of metal other than chromium and an organic component containing a modified and/or unmodified functional group; and
forming an organic resin layer on the coated film formed on the surface of the metal sheet or the plated sheet, the oxide and/or the hydroxide of the metal having a chemical bond with the organic resin layer via the functional group,
wherein the treatment agent comprises an aqueous solution comprising:
a first aqueous solution comprising a metal ion other than chromium ion and a fluorine ion in a molar ratio of the fluorine ion to the metal ion of six or more; and/or
a second aqueous solution comprising a complex ion containing a metal ion other than chromium ion and a fluorine ion in a molar ratio of the fluorine ion to the metal ion of six or more times, and
the aqueous solution further comprising an organic component containing modified and/or unmodified functional group(s) in a concentration of less than 20% by mass.

19. The composite coated metal sheet according to claim 1, wherein the organic component contains at least one selected from the group consisting of polyacrylic acid, 2-ethylhexyl acrylate, and 2,3-epoxypropyl methacrylate.

20. The method of manufacturing a composite coated metal sheet according to claim 17, wherein the organic component contains at least one selected from the group consisting of polyacrylic acid, 2-ethylhexyl acrylate, and 2,3-epoxypropyl methacrylate.

21. The method of manufacturing as composite coated metal sheet according to claim 18, wherein the organic component contains at least one selected from the group consisting of polyacrylic acid, 2-ethylhexyl acrylate, and 2,3-epoxypropyl methacrylate.

* * * * *